April 19, 1960 W. W. CLADE 2,933,669
GOVERNOR CONTROLLED DIRECT CURRENT MOTOR SYSTEM
Filed Aug. 30, 1956

INVENTOR
WILBUR W. CLADE
BY
HIS ATTORNEYS

United States Patent Office 2,933,669
Patented Apr. 19, 1960

2,933,669
GOVERNOR CONTROLLED DIRECT CURRENT MOTOR SYSTEM

Wilbur W. Clade, Wantagh, N.Y., assignor to Columbia Broadcasting System, Inc., New York, N.Y., a corporation of New York Application August 30, 1956, Serial No. 607,207

4 Claims. (Cl. 318—325)

This invention relates to the speed regulation of governor controlled direct current motors and more particularly to a new and improved governor controlled motor system which embodies means affording improved speed regulation and tending to eliminate motor runaway when the motor is energized by power from a variable voltage source.

In applications where constant speed operation of a motor is desired though the voltage supply is variable, it is customary to provide the motor with a centrifugal governor having vibrating contacts which tend to remain apart when the motor is rotating above a desired speed and are urged together at speeds below the desired value. In some cases the governor contacts are connected in parallel with a resistor in the power line, thereby reducing the voltage applied to the motor when the contacts are opened. More often, the contact connections are so made that one or more of the rotor coils is removed from the circuit when the contacts are opened. In the latter case, the proportion of time during which torque is applied to the rotor during each revolution is reduced.

While such motors are effective, they have not been found entirely satisfactory because the voltage range over which constant speed can be maintained is relatively narrow. Further, when the voltage rises above that required to drive the motor at the speed at which the governor contacts are fully opened, a runaway condition occurs.

Accordingly, it is an object of this invention to provide a new and improved governor controlled direct current motor system in which an appreciable reduction in speed variation in response to changes in voltage is effected.

Another object of the invention is to provide a new and improved governor controlled motor system of the above character in which constant speed operation may be achieved over a much wider range of supply voltage variation than has been possible heretofore.

According to the invention, constant speed operation over a relatively wide range of supply voltage variations is achieved by interposing inductance means between the DC power supply and the governor controlled motor. Where this is done, it has been found that not only is the voltage range over which constant speed operation obtains widened, but also the upper voltage limit which, if exceeded, results in a motor runaway condition, is much higher than it would be without the inductance means.

Still further objects and advantages of the invention will be apparent from a reading of the following description with reference to the accompanying drawing in which.

Figure 1:
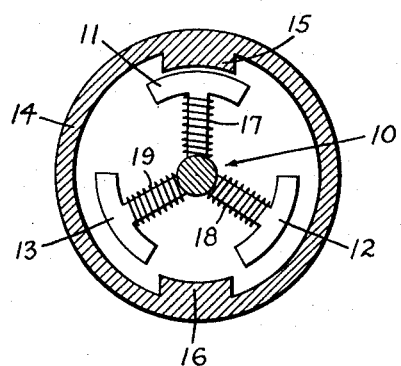
Fig. 1 is a view in transverse section, taken along the line 1—1 of Fig. 2, of a three-pole governor controlled direct current motor.

Referring first to Fig. 1, a typical governor controlled direct current motor is illustrated, in which the rotor 10 has three pole pieces 11, 12 and 13 located 120° apart and the stator comprises a yoke 14 having opposed pole pieces 15 and 16. The yoke 14 and the pole pieces 15 and 16 are magnetized and constitute a permanent magnet. The rotor pole pieces 11, 12 and 13 carry windings 17, 18 and 19, respectively, which are connected at their inner ends to the commutator segments 20, 21 and 22 mounted on the shaft of the rotor 10.

Figure 2:
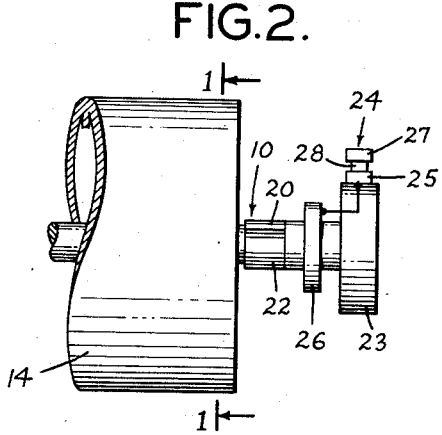
Fig. 2 is a partial view in elevation of the motor of Fig. 1.
Figure 3:
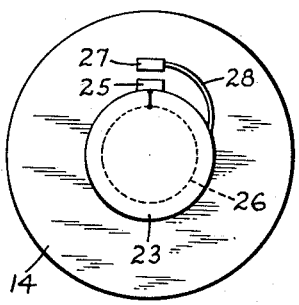
Fig. 3 is an end view of the motor of Fig. 1, showing the mounting of the governor contacts.
Figure 3:
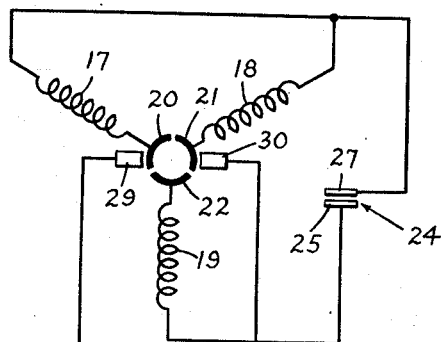

As shown in Figs. 2, and 3, the rotor shaft also carries a disc 23, on which is mounted a vibrating governor 24. The governor 24 includes a fixed contact 25, which may be electrically connected to a slip ring 26 to provide external connection, if desired, and a movable contact 27 mounted on a spring member 28, through which it is grounded to the rotor frame.

Figure 4:
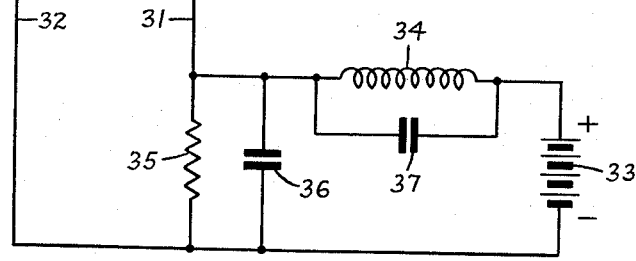
Fig. 4 is a schematic circuit diagram of a control system according to the invention incorporating a motor of the type shown in Fig. 1.

The motor windings are connected as shown in Fig. 4. Thus, two of the windings, for example, the windings 17 and 18 are connected at their outer ends to the movable contact 27 of the governor 24, while the fixed contact 25 is connected to the outer end of the third winding 19. The commutator segments 20, 21 and 22 are adapted to be engaged by opposed brushes 29 and 30, which are connected by the conductors 31 and 32 to a D.C. source which may be a 12 volt automobile storage battery 33, for example. While the terminal voltage of the battery 33 is nominally 12 volts, actually it may vary from six to fifteen volts in practice.

In order to maintain constant speed operation of the motor over this voltage range, a choke or inductance 34 is connected in series with the conductor 31 between the battery 33 and the motor. Also, a resistance 35 and a capacitance 36 in parallel are connected across the conductors 31 and 32, the choke 34 also being shunted by a condenser 37.

The resistance 35 and the condenser 36 serve to suppress sparking at the commutator segments 20, 21 and 22 and at the contacts of the governor 24 during operation.

In operation, it is found that the motor system of Fig. 4 has a higher runaway voltage than the motor without the inductance 34. Further, at voltages below the runaway voltage, the speed variation with voltage is less than when the inductance 34 is not present.

The following brief analysis will be helpful in explaining the materially improved performance obtained with the motor system of the invention. It will be observed from Fig. 4 that, so long as the governor contacts 25 and 27 are closed (i.e., the motor is running below speed), there are always two of the three coils 17, 18 and 19 receiving current from the power supply circuit. When the contacts 25 and 27 are open, however (i.e., the motor is running above speed), no current can flow through the coil 19 and the rotor 10 is, therefore, driven only when the commutator segments 20 and 21 are each in contact with one of the brushes 29 and 30. It will be observed that this condition occurs twice during each revolution of the rotor 10 and continues each time for one-sixth of a revolution. Hence, in the absence of the inductance 34 the average current supplied to the motor would fall to one-third the normal value, slowing the motor down until the contacts 25 and 27 are again closed.

Because of the presence of the inductance 34, however, the current is forced to build up slowly from zero each time the governor contacts 25 and 27 are closed. The rate of build-up of current, designated $$\frac{di}{dt}$$

may be expressed by the following equation in which $i$ is the instantaneous current, R is the resistance of the rotor coils through which current is flowing, L is the inductance of the choke 34 and E is the difference between the supply voltage and the motor back E.M.F.:

$$Ri + L\frac{di}{dt} = E$$

This equation has the well known solution:

$$i = \frac{E}{R}\left(1 - \epsilon^{-\frac{Rt}{L}}\right) \cong \frac{E}{L}t \qquad (1)$$

in which $t$ represents the time at which the current has reached the value $i$.

By way of illustration, assume the following typical values and conditions: the speed at which the motor is to be maintained is 1800 r.p.m. (30 r.p.s.) and an average current of 30 ma. is required to maintain this speed; the contacts 25 and 27 are open all the time so that the coil 17 and 18 are both energized for one-sixth revolution=one-one hundred eightieth second; the inductance 34 has a value of .7 henry; the motor behaves like a resistance of 50 ohms; and $E=12$ volts, corresponding to a supply voltage of 16.5 volts and a back E.M.F. of 4.5 volts.

The solution of Equation 1 shows that the approximate peak current at the end of the one-sixth revolution during which current is being supplied to the coils 17 and 18 is .079 ampere. The waveform of the current to the motor is a sawtooth with two out of every three teeth missing per half cycle. The average current to the motor is .016 ampere, or approximately one-sixth the peak current. Since the motor requires .030 ampere to maintain a speed of 1800 r.p.m., obviously, under the above conditions runaway could not occur with a supply voltage of 16.5 volts.

Without the inductance L, however, the current would have risen more rapidly during the one-sixth part of each cycle that the coils 17 and 18 are energized to a peak value determined by Ohm's law as:

$$i = \frac{E}{R} = \frac{12}{50} = .240 \text{ ampere}$$

The average current, therefore, would have been one-third of this or .080 ampere, which is more than sufficient to maintain a speed of 1800 r.p.m. so that a runaway condition would exist.

Thus, it can readily be seen that the inductance 34 restricts the average current that can flow when the contacts 25 and 27 are open, thereby requiring a substantially higher supply voltage to cause runaway.

In seeking an explanation for the reduction of speed variation with voltage which obtains with the novel system of the invention, the analysis will be simplified by assuming that the governor contacts open all the rotor coil connections and that the motor behaves like a pure resistance R. When the inductance 34 is not present, the current $i$ in the motor is then given by the relation $$\frac{E}{R}$$

when the contacts are closed, and is zero when the contacts are open.

For a motor having the characteristics described above, the lower limit of supply voltage required to produce regulated speed is about 6 volts. The back E.M.F. of the motor accounts for 4.5 volts leaving a 1.5 volt drop across the motor, corresponding to a rotor current of about .030 ampere, which is sufficient to drive the motor at approximately 1800 r.p.m., the governor contacts remaining closed almost continuously.

If without the inductance 34 (Fig. 4) the supply voltage rises to 10 volts, 5.5 volts more than the back E.M.F. of the motor, the rotor coils will draw a current of .110 ampere when the governor contacts are closed.

The contacts 25 and 27 have a natural resonance frequency so that in vibration they are separated for approximately one-sixtieth second, regardless of the speed of the motor. In order that the motor be driven at 1800 r.p.m., the average current must be .030 ampere. Therefore, under these conditions, the contacts need be closed only .030/.110, or 27% of the time, to maintain a speed of 1800 r.p.m. Since the contact open time is fixed at one-sixtieth second, the contacts are closed for only one-one hundred sixty-second second to obtain the desired speed of rotation.

When, on the other hand, the inductance 34 is present as in Fig. 4, the current is interrupted for about one-sixtieth second as before, but each time the contacts are closed the current builds up slowly to a maximum value, according to the relationship expressed by Equation 1. Substituting in this equation the values, $E=5.5$ volts; $R=50$ ohms; $L=.7$ henry and average $i=.030$ ampere, and assuming the contacts have an open time of one-sixtieth second, it will be found that the contacts must now be closed 49% of the time, or one-sixty-fourth second, to produce an average current of .030 ampere when the supply voltage is 10 volts. Thus, the effect of the novel system herein described is to increase both the time duration and the proportion of total time in which the contacts are closed, requiring less work to be done by the governor, so that the speed regulation of the motor is noticeably improved. It will be observed by further substitution of other values of the inductance L in Equation 1 that the speed regulation improves as the value of the inductance 34 is increased.

It will be understood that the specific circuit described above may be varied in several respects within the scope of the invention. In particular, the values of the components may be changed as required to provide any desired degree of speed regulation, or to increase the voltage at which motor runaway occurs to any desired value. The invention, therefore, comprehends all modifications falling within the scope of the appended claims.

I claim:

1. In a speed controlled motor system, the combination of a motor having magnetic field generating means and a rotor carrying a plurality of windings thereon, circuit means connecting said windings to electrical input terminals for said motor, governor means responsive to the speed of said motor controlling the ocnnections between said windings and said circuit means and a surge-limiting inductance independent of said magnetic field generating means connected in said circuit means in the path of current to said motor.

2. In a speed controlled motor system, the combination of a motor having magnetic field generating means, a rotor carrying a plurality of windings and commutator means connected to said respective windings, circuit means including brushes cooperating with said commutator means to connect said windings to electrical input terminals for said motor, governor means responsive to the speed of said motor controlling the connections between at least one of said windings and said circuit means, and a surge-limiting inductance independent of said magnetic field generating means connected in said circuit means in the path of current to said motor.

3. In a speed controlled motor system, the combination of a motor having a multipolar rotor carrying a plurality of windings thereon, a plurality of commutator means on the motor connected respectively to like ends of said windings, means connecting the other ends of two of said windings together, governor means comprising a vibrating make and break switch responsive to the speed of said rotor, means connecting said switch in circuit between the other ends of said two windings and the other end of a third of said windings, circuit means including brushes adapted to engage said commutator means for connecting said windings to input terminals for said motor, and an inductance in said circuit means and in the path of current to said windings.

4. In a speed controlled motor system, the combination of a motor having a stator comprising a magnetized yoke and opposite pole pieces, a rotor provided with a plurality of pole pieces spaced at equal angles around the axis of rotation of said rotor, commutator means on said rotor including a plurality of like commutator segments equal in number to said windings each connected to one end of one of said windings, respectively, means connecting the other ends of two of said windings together, governor means comprising a make and break switch having a natural resonance frequency and responsive to the speed of said rotor, means connecting said make and break switch between the other ends of said two windings and the other end of a third winding, circuit means including brushes engaging said commutator segments for connecting said windings to input terminals of said motor, inductance means connected in said circuit means in the current path to said windings, and means connected in said circuit means for reducing sparking at said brushes.

References Cited in the file of this patent
UNITED STATES PATENTS

| | | |
|---|---|---|
| 2,032,444 | Schwarz | Mar. 3, 1936 |
| 2,570,440 | Freiberg | Oct. 9, 1951 |
| 2,705,299 | Castagna | Mar. 29, 1955 |
| 2,819,441 | Buck | Jan. 7, 1958 |